April 9, 1957 C. W. VOGT 2,787,972
APPARATUS FOR PRODUCING PLASTIC MASSES
Filed Oct. 26, 1949 2 Sheets-Sheet 1
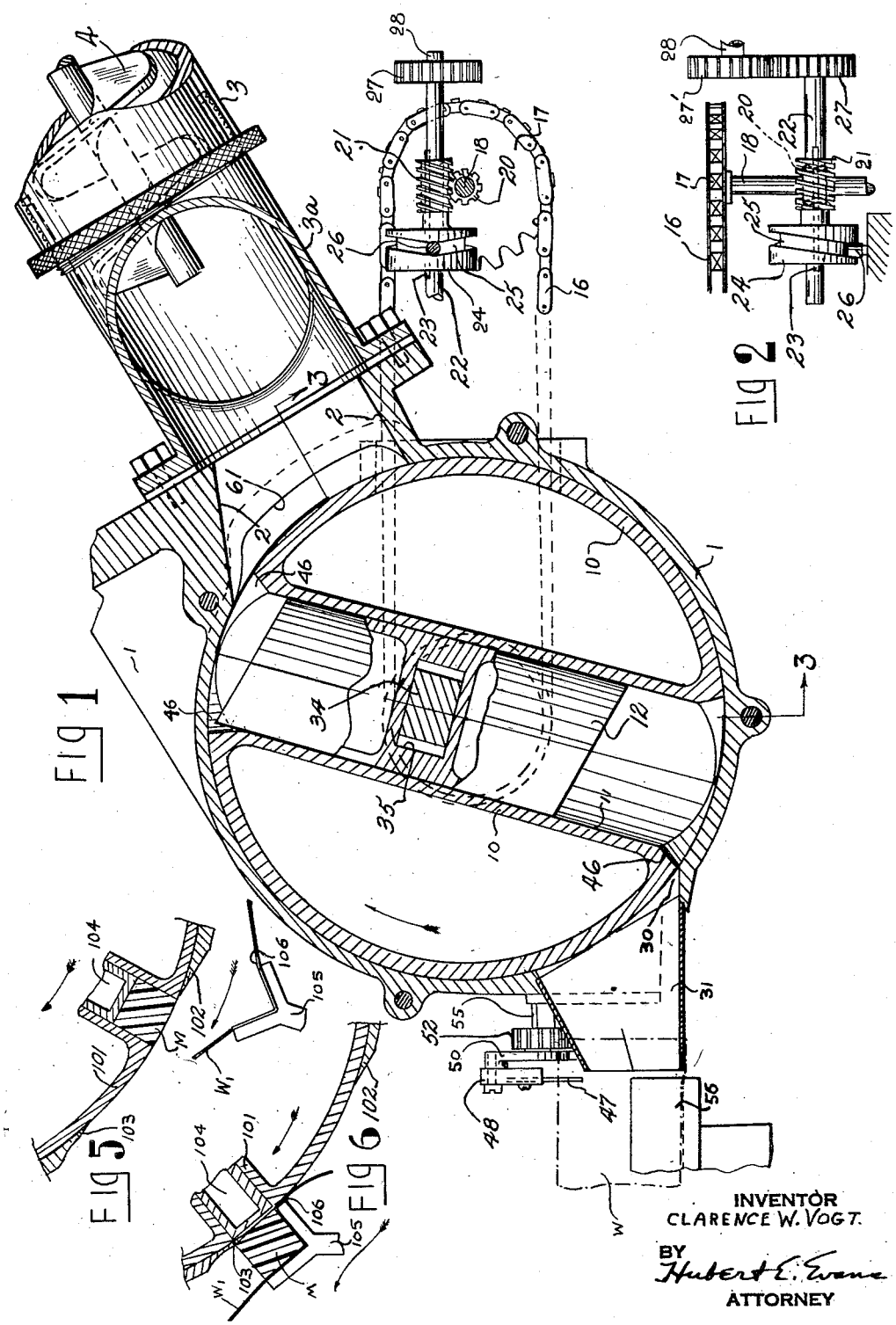
INVENTOR
CLARENCE W. VOGT.
BY
Hubert E. Evans
ATTORNEY April 9, 1957 C. W. VOGT 2,787,972
APPARATUS FOR PRODUCING PLASTIC MASSES
Filed Oct. 26, 1949 2 Sheets-Sheet 2
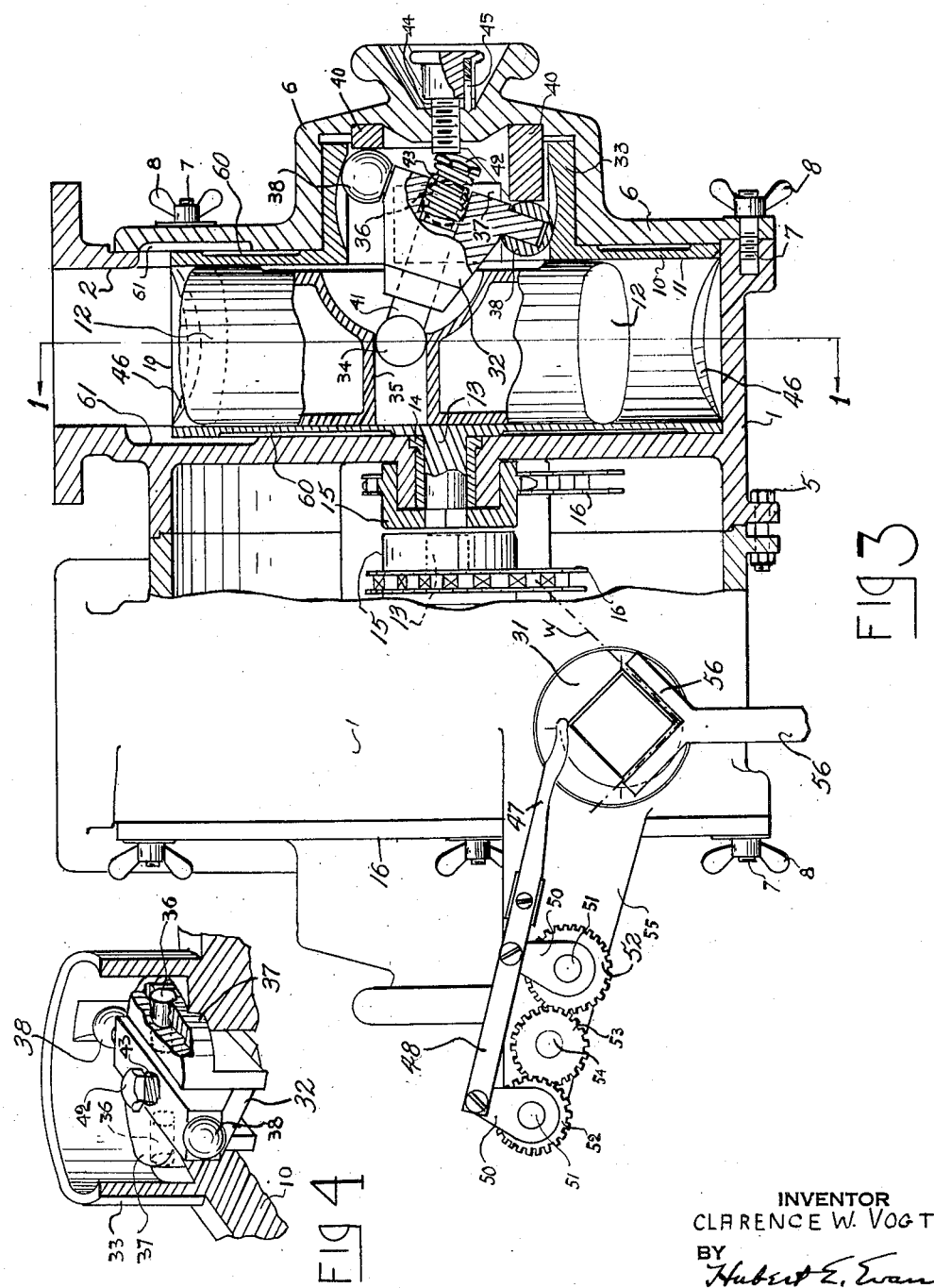
INVENTOR
CLARENCE W. VOGT
BY
Hubert E. Evans
ATTORNEY United States Patent Office 2,787,972
Patented Apr. 9, 1957

2,787,972

APPARATUS FOR PRODUCING PLASTIC MASSES

Clarence W. Vogt, Norwalk, Conn.

Application October 26, 1949, Serial No. 123,575

8 Claims. (Cl. 107—15)

This invention relates to the production of masses of plastic material, and in particular to apparatus for producing accurately measured individual masses of plastic material.

It is an object of the present invention to produce measured masses of plastic material in such a way that the plastic material may be advanced at a substantially uniform and constant rate of flow. In this way objectionable effects of intermittent flow or uneven or pulsating flow of the plastic material may be avoided.

Another object is to provide apparatus for producing plastic masses in which a plurality of sequences of measuring cavities are moved from filling zones to discharge zones and returned, and in which the measuring cavities are decelerated in their travel through the zones and are accelerated in their travel between zones.

A further object is to provide apparatus for producing plastic masses utilizing two sequences of measuring cavities in which cavities of the two sequences are alternately moved adjacent a source of supply of plastic material in such timed relation that the flow of plastic to the cavities is substantially uniform and continuous.

A further object is to provide for the production of plastic masses by which plastic from a common source of supply is measured and alternately deposited at a plurality of spaced discharge locations, from which the deposited masses may be moved along parallel paths for packaging.

A still further object is to provide apparatus for producing plastic masses in volume production with only a few moving parts in contact with the plastic, which parts are so organized and arranged that they are readily accessible for cleaning. In the case of food products or other plastics where cleanliness is required it is extremely important that the mechanism be accessible for cleaning.

Another object is to provide apparatus for producing measured plastic masses in which the plastic material may be metered and formed within a stationary housing to minimize leakage problems which may occur with surfaces having movement relative to each other.

A further object is to provide for the production of measured plastic masses while retaining the plastic material in a closed system. If the plastic material has any internal pressure it may be retained in the closed system and is therefore not able to appreciably expand until it has been disposed in unit masses ready for deposition and packaging.

Another object of the present invention is to produce plastic masses by metering and forming individual masses from a source of supply of plastic material, without unduly working the plastic or otherwise affecting its composition or physical characteristics.

Other objects and advantages will become apparent from the following detailed description accompanied by the drawings, in which:

Figure 1 is in part an elevation view of the apparatus of the present invention and in part a section taken substantially on the line 1—1 of Figure 3 looking in the direction of the arrows.

Figure 2 is a fragmentary plan view of the drive mechanism for the apparatus shown in Figure 1.

Fig. 3 is an elevational view of the apparatus shown in Fig. 1 with a portion of the view shown as a section taken substantially along the line 3—3 of Fig. 1;

Fig. 4 is a fragmentary perspective view of a portion of the actuating mechanism;

Fig. 5 is a fragmentary sectional view of a portion of a modified form of apparatus for carrying out the present invention;

Fig. 6 is a similar fragmentary sectional view similar to Fig. 5 but at a later point in its operating cycle.

For the purpose of the present invention the term plastic material shall be construed to include a semi-plastic or plastic or partially set or solidified substance which under the conditions at the time it is being acted on may be formed or extruded by the use of relatively low pressures. Such materials may be flowed or forced through conduits or passages by the application of pressure. However, such materials will generally not flow under the influence of gravity to an appreciable extent. Examples of plastic materials which may be formed into measured masses in accordance with the present invention are butter, margarine, lard and shortening as well as partially frozen materials such as ice cream, sherbets, etc.

In the handling of plastic materials it is extremely desirable that they be flowed substantially continuously and at a uniform and constant rate through relatively large passages. The flowing of plastic intermittently or at an uneven rate which results in pulsation will generally have an adverse effect on the composition or physical characteristics of the plastic. Such intermittent or uneven flow results in a repetitive application and release of force or pressure on the plastic material, which has a tendency to cause separation of one or more of the ingredients or may overwork and tend to break down some of the ingredients. In the case of butter or margarine such working may result in release of the water content and even a breaking down of the fatty compounds, obviously decreasing the quality of the product.

I have also found that intermittent and uneven flowing of the plastic affects the accuracy of measurement of individual plastic masses. It is therefore a primary feature of the present invention to advance plastic material continuously from a source of supply and to meter the flow so that measured amounts of plastic material may be continuously and uniformly removed from the source of supply and formed into masses containing accurately measured predetermined amounts. It is also believed preferable to accomplish these results by a continuously moving mechanism. Further, to obtain accuracy in the amounts of the individual masses it is, as a practical matter, necessary to sever or remove the individual masses from the forming mechanism. This is important since the plastic materials generally have a tendency to adhere to any surface with which they come in contact, and therefore to obtain complete removal or separation the masses must be severed, sheared or wiped from the forming mechanism.

To accomplish these desired results a plurality of sequences or series of measuring pockets or cavities may be arranged to move from a common source of supply where they receive measured amounts of plastic material to separate discharge stations at which point each pocket or cavity is caused to expel the measured amount of plastic material contained therein into a forming aperture. The expulsion causes a like amount of plastic material to be extruded or flowed through the forming aperture where it may be removed and deposited for packaging. In this way, masses may be alternately severed and deposited from the various discharge stations. The sequences of molding pockets or cavities may be returned to the filling zone to receive additional measured amounts of plastic material. After deposit and severance of the plastic masses at the several discharge stations they may be conveyed for packaging in a plurality of paths, which may be spaced parallel paths.

The metering and forming mechanism is preferably arranged so that it may be enclosed within a stationary housing to obviate problems of leakage of plastic from between relatively moving surfaces. The source of supply of plastic material may be connected to an intake port leading through the housing and the forming apertures may be stationary and either mounted on or integral with the housing. The only location where leakage may occur is at the entrance of the driving mechanism through the housing. The sealing of such driving shafts entering a stationary housing is conventional and does not create a problem.

The drawings illustrate a preferred embodiment of a mechanism for carrying out the present invention. A stationary housing 1, which may be supported in any suitable manner, is shown in Figs. 1 and 3 and is provided with an intake port 2 adapted to be connected to any suitable source of supply of plastic material. The source of supply may be a continuous process apparatus for manufacturing the plastic material and delivering it under pressure such as is the case with margarine, shortening and the like. In the case of plastics, such as butter, which are produced in batches or lots, the plastic material may be advanced to the intake port by a suitable conveyor which will provide a supply of the material under pressure. In Fig. 1 a conduit 3 is indicated in dot-dash lines through which the plastic material may be advanced such as by a spiral conveyor or screw 4.

The present invention is illustrated as having 2 sequences or series of molding pockets or cavities although it may be desired to provide more than two. This means that each sequence will move from the source of supply to its separate discharge station where plastic masses will be deposited for packaging. Thus the housing 1 is separable into two parts which may be held together by bolts as indicated by the numeral 5 in Fig. 3. Each half of the housing is substantially identical and contains similar mechanisms. The conduit 3 may terminate in branches 3a to permit the plastic material to be introduced into both of the intake ports. In any event, it is to be understood that the intake ports 2 of both halves of the housing are in communication with a common source of the plastic material so that, by proper control of the plurality of measuring cavities, an equal area of flow is always open to the material being fed from the common source. The spaced opposite ends of the housing 1 may be closed by suitable lids or cover plates 6 secured to the housing by studs 7 and wing nuts 8 to provide ready removal of the lids and easy access to the interior of the housing.

Disposed within each half of the housing is a rotary member 10 and formed within the rotary member is a bore 11 adapted to receive for sliding movement therein a piston member 12. The rotary members 10 are preferably driven with a continuous movement although the rate of movement during portions of the rotary cycle may be varied. Fig. 3 shows each of the rotary members as provided with a stub shaft 13 journaled in a sleeve bearing 14 carried by the housing 1. This bearing serves to seal the housing against leakage of plastic from the housing. The end of the shaft 13 may be squared or otherwise shaped and may be received in a complementary shaped aperture of a sprocket member 15 mounted for rotation with respect to the housing 1. The teeth of the sprocket 15 are engaged and driven by a chain 16 which is also entrained about a similar sprocket 17, mounted on a shaft 18 of the driving unit, spaced from the housing.

Figs. 1 and 2 show a preferred means for driving each of the rotary members 10. The shaft 18 on which the sprocket 17 is mounted, also carries for rotation a worm wheel 20. Meshing with and driving the worm wheel 20 is a worm 21 which is mounted for sliding movement along a shaft 22 but fixed for rotation with the shaft by an elongated key 23. A cylindrical or barrel cam 24 is similarly mounted on the shaft 22 and is secured to move in an axial direction with the worm 21, being fixed for rotation with the shaft 22 by the elongated key 23. Accordingly, both the worm 21 and the cam 24 may move axially along the shaft 22 during rotation thereof as dictated by the configuration of a cam track 25 and a fixed roller 26 mounted adjacent and disposed in the cam track 25.

The shaft 22 is powered by a pair of meshing gears 27 and 27', one of which is mounted for rotation with the shaft 22 and the other of which is mounted for rotation with a main driving shaft 28. The shaft 28 may be connected to any suitable source of power (not shown) preferably driving it at a uniform rate which may be adjustable, if desired.

The purpose of this driving means is to provide a variable speed rotary cycle for each of the rotary members. For example, they may be caused to move relatively slowly through the filling and discharge zones and to travel between zones at an appreciably accelerated speed. If during rotation of the worm 21 the cam track 25 angles at an angle approaching the lead angle of the worm, the axial movement of the cam and worm along the shaft 22 will prevent the worm from exerting its full driving effect to the worm wheel 20 and the shaft 18 will be driven more slowly. The extent of this decelerated movement of the shaft 18 is controlled by the peripheral extent of the desired curve of the cam track 25. Since the cam track returns the cam and worm to their initial starting point during every revolution there will be an opposite or reverse angling of the cam track 25 causing an acceleration in the rotary speed of the worm-wheel 20 and the rotary member 10. It may be seen that by varying the angularity and the peripheral extent of the curvature of the cam track almost any desired conditions can be obtained. With the piston members 12 being double ended, the rotary members 10 may complete their operating cycle in one-half a revolution. This means that the shaft 18 driving the rotary members may rotate at half the speed of the shafts 22 and 28. Thus for practical considerations of size, etc. it is preferable to utilize a multiple thread worm and a suitable worm wheel to effect a two to one reduction.

Disposed approximately diametrically opposite from the intake ports 2 are discharge stations 30 which open through the housing and lead to suitably shaped forming apertures or nozzles 31 (see Fig. 1). As the rotary members 10 revolve past the intake ports 2, the piston members 12 are slidably moved or withdrawn into the bore 11, to form measuring pockets or cavities of a predetermined size which receive a predetermined amount of plastic material flowing from the source of supply. The plastic material in the source of supply is under pressure and the withdrawing of the piston members facilitates the flow of plastic into the measuring pockets or cavities. Thus, each pocket or cavity is completely filled with a measured amount of plastic material, determined by the bore and stroke of the piston, and further rotation of the member 10, moves the measured charge of plastic material to the discharge station. At this point the piston is moved to expel the measured charge and force it through the forming aperture or nozzle 31. This flow of a measured amount of plastic material through the nozzle will cause the extrusion or formation of a formed individual mass of plastic material containing an accurately measured amount, ready for deposition and packaging. Further movement of the rotary members returns the pistons to the intake ports to repeat their cycle. It may be noted that the piston members 12 are double ended so that as one end of each piston is receiving plastic material the opposite end is expelling the material previously deposited in the pocket or cavity obtained by withdrawal of the piston into the bore.

Each piston member may be actuated by any suitable mechanism. Figs. 3 and 4 show an actuator 32 carried within a collar or annular extension 33 of the rotary member 10. The actuator 32 carries a cylindrical contact member 34 which extends into an opening 35 through the piston, which opening is dimensioned so that the piston walls closely fit the cylindrical sides of the contact members 34. Extending outwardly from opposite sides of the actuator 32 are a pair of pivot shafts 36, which are mounted for pivotal movement in segmental bearing members 37 retained within the collar 33 of the rotary member 10. The pivotal shafts 36 support the actuator so that it may be oscillated about the axis of these shafts to cause movement of the piston. Disposed on an axis perpendicular to the axis of the shafts 36 are a pair of spherical rollers 38. The rollers 38 are influenced by an annular stationary cam 40 carried by each of the lids 6. The shape of the cam member 40 controls the amount and timing of the oscillation of the actuator which in turn controls the timing and stroke of the piston.

In operation, as the rotary member 10 moves an end of the piston adjacent the intake port, the slope of the cam member 40 acting against the rollers 38 moving thereover causes the actuator 32 to oscillate about the axis of the pivot shafts 36 and move the contact member 34. This moves the piston member 12 so that it withdraws into the bore 11 at the intake port to provide a measuring cavity to receive a measured charge of plastic material, while the opposite end of the piston member 12, which is disposed at the discharge station, expels the measured charge it had previously received, into the forming aperture to cause extrusion of a measured mass of plastic from the forming aperture ready for severance and depositing for packaging.

To permit adjustment of the amount of the piston stroke and thus control the amount of measured charge placed in each measuring cavity, the cylindrical contact member 34 is carried on a stem or rod 41 mounted for sliding movement through the actuator 32. The end of the stem 41 opposite from the contact member 34 terminates in a spherical head 42. The head 42 may be threadedly connected or otherwise secured to the stem 41 after assembly of the stem and the actuator 32. A compression spring 43 is disposed around a portion of the stem 41 with one end bearing against the underside of the head 42 and the other end bearing against a shoulder or abutment in the aperture through the actuator 32 in which the stem is mounted. Thus the spring 43 tends to move the stem 41 axially so that the contact member 34 is urged toward the pivotal axis of the shafts 36. To retain the desired position of the contact member with respect to the pivotal axis of the actuator an adjustment screw 44 may be threadedly mounted in the cover plate 6 and extends inwardly to contact the spherical head 42. To retain the adjusted position of the screw 44 it may carry a pawl 45 which may be spring-urged into one of a plurality of sockets formed in the cover plate. (See Fig. 3.) It may be noted that as the rotary members revolve they carry with them the actuator members 32 causing the spherical rollers 38 to travel along the annular cam 40, actuating the piston at the desired time and for the desired amount. The adjustment screw 44 may be moved to change the effective length of the stem 41 and thus the measured amount of each plastic mass during the operation of the machine.

As may best be seen in Fig. 1, the end faces of the piston members may be in a plane disposed at an angle with the axis of the pistons 12 and the bore 11 so that during the intake and discharge of the piston a generally uniform flow of the plastic material into and out of the measuring pockets or cavities is obtained. Also the portions of the bore at the periphery of the rotary member may be widened or tapered as indicated at 46 in Figs. 1 and 3 to facilitate the flow of plastic material into and out of the measuring pocket.

The provision of constant and uniform flow of the plastic material may be accomplished by the proper design of the cam track 25 and the cam 40. By way of illustration each of the rotary members 10 may move at a decelerated rate through an angle of approximately 30° which is preferably less than the arcuate length of the intake and discharge ports by at least about 10°. This decelerated movement of the rotary member may occur during half a revolution of the driving shaft 28. In the other half of the revolution of the driving shaft the rotary member may be caused by the cam track 25 to move about 150° (the balance of its operating cycle) at an accelerated rate which will present the opposite ends of the piston member 12 to the intake and discharge ports. The other of the rotary members may be driven with the same operating cycle but out of phase with the timing of the first rotary member so that when one is moving at its accelerated rate the other is moving at its decelerated rate.

The came 40 may cause sliding movement of the piston member with respect to the rotary member 10 during arcuate movement of the rotary member 10 for about 40°. Thus a small portion of the piston stroke occurs during the change of the rotary member from its accelerated motion to its decelerated motion and from its decelerated motion to its accelerated motion. Obviously the intake and discharge ports should be dimensioned and positioned so that at least a portion and preferably half of the end faces of the pistons are presented to the ports during the piston stroke. It may be seen that as one of the piston members is withdrawing to provide a measuring pocket for receiving a charge of plastic material, the piston of the opposite rotary member is moving between the intake and discharge stations. However, the timing of the piston strokes is such that there is an overlap and one piston starts withdrawing before the other has finished. In this way the flow through the source of supply may be synchronized so that it is substantially constant and uniform.

To sever or remove each extruded mass of plastic material forced through the forming aperture or nozzle 31, a severing blade or knife 47 may be mounted adjacent the end face of the nozzle. This knife may be driven by any suitable mechanism but preferably its tip is caused to travel in a path generally approximating the shape of the end face of the nozzle. In this way the movement of the knife 47 will sever the mass of plastic material at the end face of the nozzle and will return to its original position without again passing through the plastic material extending through the nozzle. Fig. 3 illustrates one suitable driving mechanism for the blade. The blade 47 may be detachably carried by a connecting bar 48 mounted on crank arms 50 which are secured to and driven by shafts 51. These shafts 51 also carry gears 52 which mesh with an intermediate gear 53 carried by a shaft 54. The shafts 51 and 54 may be journalled in an extension 55 of the housing and any one or more of these shafts may be driven from a suitable source of power (not shown).

To package the measured masses of plastic material severed from the nozzles by the knives 47, suitable enwrapments may be supplied to pass adjacent the discharge nozzle. In this way the masses of plastic material may be deposited directly onto the enwrapments and advanced through suitable packaging machinery. The present invention relates primarily to the production of measured plastic masses and therefore the completion of the packaging of the masses is not disclosed more completely. The feeding and supplying of enwrapments for packaging plastic masses is disclosed in my U. S. Letters Patent, Nos. 2,626,074 granted January 20, 1953 and 2,653,813, granted September 29, 1953.

For purposes of illustration, however, the drawings illustrate support members 56 adapted to carry thereon suitable sections of sheet material W having a V-shaped configuration with the apex of the V aligned with the nozzle so that a corner edge of the formed mass may be deposited in accurate registry with the edge portions of the enwrapment section. The enwrapments W may be suitably retained by the support members such as by the use of vacuum ports opening through the V-shaped surfaces of the support members.

As has been described, the entire mechanism for metering or measuring and forming the individual masses is enclosed within a stationary housing. This obviates the problems of sealing surfaces having movement relative to each other which creates leakage difficulties now found in present day commercial mechanisms for forming plastic materials. Also, in the present invention, provision is made for the flow of the plastic material through the housing to provide a balanced system in which the plastic material itself may be utilized as a lubricant. To facilitate this flow the side faces of the rotary members may be relieved as indicated by the numeral 60. Further, the intake port of the housing and the cover plates may be provided with channels or grooves 61 so that the plastic material from the source of supply may flow directly to both sides of the rotary members 10 as best seen in Fig. 3.

The modified form of the invention illustrated in Figs. 5 and 6 shows how the measuring and forming mechanism may be constructed so as to combine the forming means for molding the individual masses with the measuring pockets or cavities. This simplifies the separation or removal of the masses produced and their deposit into enwrapments for packaging. Figs. 5 and 6 show a rotary member 101 mounted within a stationary housing, portions of which may be seen at 102 and 103. A piston 104 is mounted for sliding movement in an aperture or bore extending through the rotary member and the piston is driven in the same manner as described in connection with Figs. 1 through 4 to form measuring pockets or cavities to receive charges of plastic material.

In Fig. 5 the piston 104 is just entering the discharge station defined by the edge portion 102 of the housing. At this point expelling of the charge of plastic material may start and the mass is expelled from the rotary member by the stroke of the piston. As the plastic mass is being expelled, a support member 105 carrying an enwrapment W' may be advanced into receiving position and meet the mass of plastic material M just as the piston completes its stroke. This is approximately the position shown in Fig. 6, and it may be seen that further movement of the rotary member 101 will sever or shear the plastic mass from the end face of the piston due to the edge 103 of the stationary housing defining the end of the discharge station. This edge 103 of the stationary housing may be sharpened or formed to facilitate the desired shearing action. Further, as the support member 105 continues its movement to convey the mass for packaging, the trailing flap 106 of the enwrapment W' may wipe the edge 103 of the housing clean to insure clean separation of the plastic material and accurate measurement of the plastic mass. If desired, the edge 103 of the housing may be hollow ground as shown to assist in accomplishing a clean wipe.

In this construction it will be noted that the shape of the bore of the rotary member and the piston, which jointly form the measuring pocket, mold or form the shape of the plastic mass. Thus expulsion of the mass may be accomplished through the opening in the housing defined by the portions 102 and 103 thereof. While only one rotary member 101 and piston 104 are illustrated, it will be understood that there may be two or more of these units as was disclosed in connection with Figs. 1 through 4.

It will be obvious that while the drawings show the production of plastic masses having a square or rectangular transverse cross-sectional outline, the masses may have many other configurations such as round, triangular, hexagonal, etc., or even some desired irregular outline. This is especially true in connection with the form of the invention shown in Figs. 1 through 4 where the mass is formed in a direction perpendicular to its smallest cross-sectional area. The shape of the forming aperture will control the configuration of the mass and if desired, interchangeable nozzles may be provided. At the same time the piston members and bores of the rotary members may be cylindrical and will measure and expel accurately measured masses. The measuring cavities are shown as sufficiently big so that one charge completes the production of a measured mass. This means that the passages through the source of supply, intake ports, etc., may be relatively large so as not to overwork or adversely affect the plastic material.

In the form of the invention shown in Figs. 5 and 6, the shapes of the masses which may be produced are limited to those which may be placed in and removed from the molding cavities. To avoid the formation of masses having rounded surfaces it is preferable to dispose the molding cavities so that one of the shorter dimensions extends along the arcuate periphery of the rotary members.

I have also discovered that to obtain the desired accuracy of measurement with certain plastic materials it may be desired to insure that the plastic material is under a constant and uniform pressure at the time it is disposed in the measuring cavities or pockets formed by the pistons and rotary members. By way of illustration, if the plastic material has any tendency to expand, as, for example, when it contains entrained air or gas, improved accuracy in the weights of each formed mass may be obtained when the measuring pockets (having a predetermined volume) are filled with plastic at a uniform predetermined pressure or have such pressure applied to them before the plastic is expelled therefrom.

The apparatus shown and described is very advantageous for use in the production of plastic masses, especially where the plastic material is a food product or the like where extreme cleanliness is required. The moving parts are readily accessible and removable for cleaning. Removing the lids 6 from the housing permits the rotary members, pistons and actuating mechanism to be readily withdrawn from the housing for cleaning. The use of double ended pistons means a reduction in the number of parts for producing the masses. For example, a single actuating mechanism may control the operation of two measuring pockets with uniformity. It may also be noted that the construction of the parts of the actuating mechanism may be such that they are retained in working association when assembled by the arrangement of adjacent parts, which simplifies assembly and disassembly.

The present invention provides for the production of accurately measured masses of plastic material on a high production basis by a simple compact mechanism. Plastic material is continuously and uniformly flowed through the source of supply to the sequences of measuring pockets, and at the separate discharge stations formed plastic masses are alternately deposited for packaging. The measuring and forming means may be continuously operated and so do not operate spasmodically or intermittently on the plastic.

It will be appreciated that in the drawings, proportions have been exaggerated in some instances to provide a greater understanding of the invention.

It will be understood that the foregoing description of preferred embodiments of the invention is for the purpose of explanation and illustration and numerous variations and modifications other than those which have been described may be made without departing from the spirit of the invention.

What I claim is:

1. In apparatus for producing plastic masses a rotary measuring member, and means for driving said rotary member at varying rates during its rotary cycle including a worm wheel connected to drive said rotary member, a worm mounted for axial movement on a driving shaft and in meshing engagement with said worm wheel, and means to move said worm axially during rotation thereof.

2. In apparatus for producing measured masses of plastic material a rotary member, a piston mounted for sliding movement in an aperture in said rotary member, and means for causing sliding movement of said piston including a member mounted for pivotal movement about an axis and for rotary movement in timed relation with said rotary member, a contact element on a free end of said member in contact with said piston, and means for causing predetermined pivotal movement of said member during rotary movement thereof, said last named means comprising a stationary cam and oppositely extending cam followers on the pivoted member engaging the cam.

3. In apparatus for producing measured masses of plastic material a rotary member, a piston mounted for sliding movement in an aperture in said rotary member, and means for causing sliding movement of said piston including a member mounted for pivotal movement about an axis and for rotary movement in timed relation with said rotary member, a contact element on a free end of said member in contact with said piston, means for causing predetermined pivotal movement of said member during rotary movement thereof, said last named means comprising a stationary cam and oppositely extending cam followers on the pivoted member engaging the cam, and means to vary the length of the contact member from the axis of movement of the pivoted member to the point of contact of said element with the piston.

4. In apparatus for producing measured masses of plastic material, a housing having a circular chamber formed therein, a rotor having a circular periphery and received in the chamber and adapted to rotate therein, material intake and discharge ports in the housing, a bore formed in the rotor and communicating with the circular periphery thereof, piston means slidably mounted in the bore, means to reciprocate the piston means, and means to rotate the rotor at a relatively slow speed when the bore is in communication with the discharge port and at a relatively high speed during at least a portion of the balance of its rotation.

5. In apparatus for producing measured masses of plastic material, a housing having a circular chamber formed therein, a rotor having a circular periphery and received in the chamber and adapted to rotate therein, material intake and discharge ports in the housing, a bore formed in the rotor and communicating with the circular periphery thereof, piston means slidably mounted in the bore, means to reciprocate the piston means, and means to rotate the rotor at a relatively slow speed when the bore is in communication with the intake and discharge ports and at a relatively high speed while the bore is out of communication with such ports.

6. In apparatus for producing measured masses of plastic material, a housing having a circular chamber formed therein, a rotor having a circular periphery and received in the chamber and adapted to rotate therein, material intake and discharge ports in the housing, a bore extending diametrically through the rotor and communicating with the circular periphery thereof at diametrically spaced points, unitary piston means in the bore and having faces extending in opposite directions, means for moving the piston means in the bore to cause measured masses of plastic material to be introduced into the bore in communication with the intake port and simultaneously to cause measured masses of plastic material to be ejected from the opposite end of the bore in communication with the discharge port, means to actuate the piston means while the bore is in communication with the intake and discharge ports and means to rotate the rotor at a relatively slow speed when the bore communicates with the intake and discharge ports and at a relatively high speed while the bore is out of communication with the ports.

7. In an apparatus for producing plastic masses, a rotary measuring member, and means for driving said rotary member with intra-cycle speed variations including a driving shaft, a sleeve mounted to turn with said driving shaft and to move axially with respect to said driving shaft, a cylindrical cam member connected to said sleeve to provide predetermined axial movements of said sleeve during rotation thereof, a first gear member connected to rotate and move axially with said sleeve, a second gear member in meshing engagement with said first gear member and mounted for rotary movement only, and a driving connection between said second gear member and said rotary member.

8. Apparatus according to claim 4 wherein the means to rotate the rotor comprises a worm wheel to drive the rotor, a worm mounted for axial movement on a driving shaft and in meshing engagement with the worm wheel, and means to move the worm axially.

References Cited in the file of this patent

UNITED STATES PATENTS

| 1,046,924 | Wilson | Dec. 10, 1912 |
| 1,088,532 | Callow et al. | Feb. 24, 1914 |
| 1,690,476 | Christiansen | Nov. 6, 1928 |
| 1,763,322 | Painton et al. | June 10, 1930 |
| 1,780,601 | Ranney | Nov. 4, 1930 |
| 1,867,998 | Benson | July 19, 1932 |